UNITED STATES PATENT OFFICE.

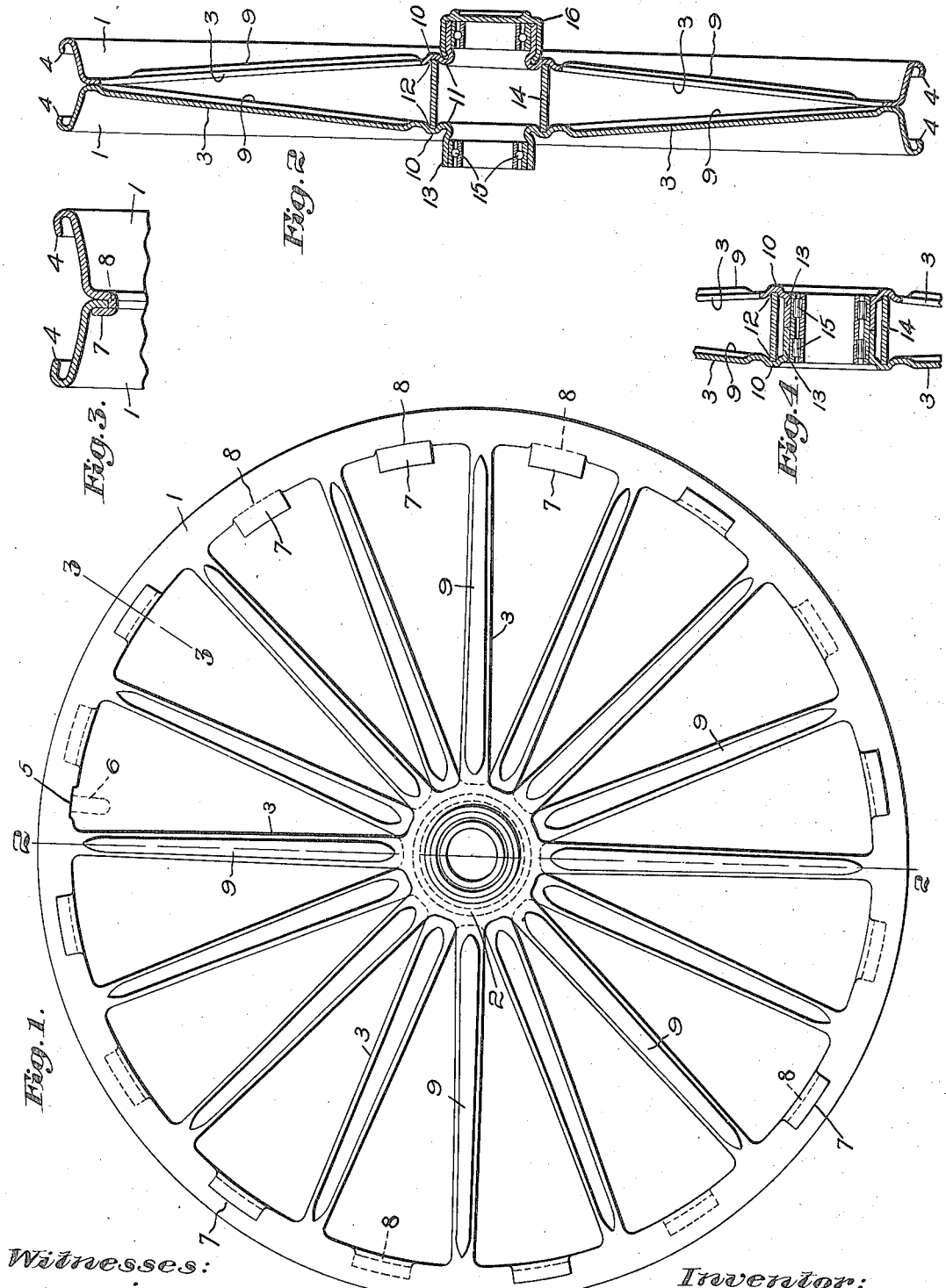

ANDREW O. VESTINE, OF WORCESTER, MASSACHUSETTS.

WHEEL.

1,196,408.                    Specification of Letters Patent.        Patented Aug. 29, 1916.

Application filed September 1, 1915. Serial No. 48,541.

*To all whom it may concern:*

Be it known that I, ANDREW O. VESTINE, a citizen of the United States, and a resident of Worcester, county of Worcester, State of Massachusetts, have invented an Improvement in Wheels, of which the following description, in connection with the accompanying drawings, is a specification, like characters on the drawings representing like parts.

This invention relates to wheels and more particularly to vehicle wheels. Its object is to provide a novel form of construction comprising, among others, the advantages hereinafter referred to.

In the drawings of an illustrative embodiment of my invention selected for description, Figure 1, is a side elevation of a vehicle wheel adapted for use on motor vehicles; Fig. 2, a vertical section on the line 2, 2, of Fig. 1; Fig. 3, a detail sectional view on the lines 3, 3, Fig. 1; and Fig. 4, a detail of a modified form of hub construction.

My improved wheel may be constructed of any suitable material, as metal, and preferably in sheet form. The wheel, as illustrated, Fig. 1, may comprise two similar wheel members died out or otherwise fashioned, of suitable dimensions and strength, which members may consist each of a rim section 1, a hub section 2, and one or more spokes 3. The rim may be of any convenient configuration in cross-section, and I have shown it herein provided with opposed inturned flanges 4, 4, adapted to receive a pneumatic tire and shoe therefor of common type. The rim 1 may be cut away at a convenient point as at 5, to receive the usual air valve 6 of the pneumatic tire.

At suitable points thereon, see Fig. 1, as between every two spokes, each wheel member is preferably provided with an inwardly extended lip 7 of suitable dimensions, which may be either died out or otherwise fashioned integral with the rim 1, or if preferred, it may be a separate member and secured to the rim in any convenient manner. The rim is also preferably cut away at suitable points on its inner edge, see Fig. 1, as between every two spokes, to form recesses 8, to receive a lip 7 on the opposite wheel member. In Fig. 1, one lip 7 and one cut away portion 8 on the two opposed wheel members are shown in the position they occupy relative to each other before the wheel members are locked together. The spokes 3 on the wheel members are preferably struck up or otherwise fashioned also to provide an elongated reinforcing rib 9, which rib may add both strength and attractiveness to the appearance of the wheel. The hub 2, Fig. 1, is conveniently formed also by fashioning the same from the sheet material. The material Fig. 2, is first bent outwardly to form a rib 10, then inwardly to form an adjacent rib 11 and forming at the same time opposite the rib 10 a groove or channel 12 to be hereinafter referred to. The material may then be struck up or otherwise fashioned and extended outwardly to form a flange 13 thereby constructing an outwardly extended hub.

The wheel members are conveniently assembled in the following manner: The two wheel members are positioned opposite each other with the spokes 3 and lips 4 relatively alternately positioned. A strut member or collar 14 is then preferably positioned in the opposed grooves 12, 12, near the hub, and this collar is preferably somewhat, for instance one sixteenth of an inch, longer than the actual distance between the inner faces of the opposed grooves 12, 12. The lips 7, 7, on the opposed rims 1, 1, are then bent over upon the inner edge of the opposite rim and down against the outside of the rim, as shown in section in Fig. 3, suitable pressure being applied, to bind the two rims tightly together and forming thereby a secure locking engagement thereof. The collar 14 being slightly longer than necessary to fill the space normally between the two grooves 12, 12, the spokes 3, when the lips 7 are locked over the adjacent rim, are thereby sprung a little toward each other to permit the locking of the rims as described. This provides a stiff, strong spoke which imparts the desired rigidity to the wheel structure. If desirable the strut 10 may be spot-welded to the grooves 12, 12, to add to the rigidity of the wheel structure at that point. If desired the wheel members may be assembled by placing the spokes opposite each other, thus forming a substantially oval spoke nearer the conventional form. In such case the rims 1, 1, would of course have the lips 7 and the recesses 8 so disposed on them as to register one with the other.

In Fig. 4 I have shown a modified form of construction of the hub wherein the flanges 13, 13, are inturned to provide a flush or smoothfaced hub. Obviously the flanges 13, 13, on each side of the hub may be fashioned as desired to receive any form of box or ball bearing for the axle. In any case the hub may be provided with ball or roller bearings 15 as desired, the illustration herein being purely of conventional form. If desired also an ornamental cap 16 a's of brass, may be applied to the outer end of the hub, see Fig. 2, and it may be retained thereon by inturning the inner edge of the cap to cause it to tightly engage the channel opposite the rib 11 at the inner end of the hub.

The foregoing construction provides a most satisfactory, inexpensive and efficient wheel the details of which may be modified within the spirit of my invention.

Claims:

1. A wheel comprising a plurality of opposed, interlocked wheel members fashioned from sheet material, each member comprising a rim, a spoke, a hub, a rim locking member on one rim engaging locking member receiving means on the opposite rim, a channel in each hub member and a strut between the wheel members seated in said channels, the hub members being upwardly and outwardly bent and forming bearing receiving seats to hold the bearing against inward travel, and providing cap engaging shoulders.

2. A wheel comprising opposed interlocked rim section members 1, 1, provided with hub members 2, 2, opposed spokes 3, 3, and flanges 4, 4, the flanges provided alternately with rim locking members 7, 7, locking member receiving means 8, 8, and channels 12, 12, the strut 14 seated in said channels.

In testimony whereof, I have signed my name to this specification, in the presence of two subscribing witnesses.

ANDREW O. VESTINE.

Witnesses:
ARTHUR E. CARSON,
EVERETT S. EMERY.